United States Patent [19]
Yoon

[11] Patent Number: 5,632,784
[45] Date of Patent: May 27, 1997

[54] METHOD OF MANUFACTURING A LITHIUM BATTERY

[75] Inventor: Jae-Gu Yoon, Seoul, Rep. of Korea

[73] Assignee: Daewoo Electronics, Co., Ltd., Seoul, Rep. of Korea

[21] Appl. No.: 691,039

[22] Filed: Aug. 7, 1996

[51] Int. Cl.$^6$ .................................................. H01M 10/38
[52] U.S. Cl. .......................................... 29/623.1; 429/194
[58] Field of Search ............................ 29/623.1; 429/194

[56] References Cited

U.S. PATENT DOCUMENTS 5,370,710 12/1994 Nagamura et al. .................... 29/623.1

FOREIGN PATENT DOCUMENTS

| | | |
|---|---|---|
| 52-32539 | 3/1977 | Japan . |
| 53-123835 | 10/1978 | Japan . |
| 61-46948 | 6/1980 | Japan . |
| 7-3785 | 5/1988 | Japan . |

Primary Examiner—John S. Maples
Attorney, Agent, or Firm—Foley & Lardner

[57] ABSTRACT

A method of predischarging a novel battery wherein a stable lithiated film is formed at an anode by a small amount of the discharged capacity in order to rapidly recover the open circuit voltage of the battery, is disclosed. The battery includes a cathode using lithium metal as an active material, an anode using manganese dioxide as a main component of an active material, and an electrolyte including an inorganic electrolyte dissolved in a nonaqueous solvent containing at least propylene carbonate. The battery is predischarged by using a pulse current. The amount of discharge is not more than about 2% of the total discharge capacity. A lithiated film which is formed at the anode portion while being partially oxidized to lithium ions, is uniformed. By a small amount of the discharged capacity, a high potential portion can be removed and the gas generation reaction can be suppressed. In addition, the life of the battery is lengthened and the flatness of the battery's voltage is improved.

11 Claims, 6 Drawing Sheets

METHOD OF MANUFACTURING A LITHIUM BATTERY

BACKGROUND OF THE INVENTION

The present invention relates to a method of manufacturing a lithium battery, and more particularly to a method of manufacturing a lithium battery in which the lithium battery is assembled by using manganese dioxide as an anode active material and lithium metal as a cathode active material, and then is predischarged.

DESCRIPTION OF THE PRIOR ART

A lithium battery is generally used as an electric power source for a portable electronic device such as a camcorder or the like since the battery is easy to carry and is easy to mount on the electronic device. The lithium battery comprises lithium metal as a cathode active material and manganese dioxide as an anode active material. The lithium battery also includes an electrolyte which includes an inorganic electrolyte dissolved in a nonaqueous solvent containing propylene carbonate. The lithium battery has a low self-discharge and a high energy density. In addition, the lithium battery can obtain a high voltage of 3.0 V, and can be manufactured with a stable material at a low cost due to the abundance of lithium resources.

However, the lithium battery has an open circuit voltage of about 3.6 V at an initial discharge thereof. Therefore, the open circuit voltage may give an important defect on an electric device using a lithium battery as an electric power source and may decompose the electrolyte, thereby lowering the battery's life.

The reasons for the high voltage at the initial discharge are still unclear. However, one possible reason is that it is due to oxides of higher order of manganese dioxide, an anode active material, after the battery has been assembled.

Therefore, it is necessary to supply a battery which has the initial high potential portion removed. In order to remove the initial high potential portion, first, a method of adding a material to an anode has been generally used, wherein the material has low potential. As such materials, for example, a metal which has low potential such as zinc or vanadium has been generally used. In addition, in Japanese Patent Publication No. 7-3785, a method is disclosed, wherein instead of metals, oxides such as copper oxide, bismuth oxide, and titanium dioxide or the like are added to an anode. When a metal is integrally added in the formation of an anode, the metal may be dissolved in an electrolyte to be ionized. So the dissolved metal ions may be agglomerated on the surface of a lithium cathode, so the battery performance may be lowered. Also, a method of adding an oxide to an anode has been recently suggested, but because the potential of the oxide may cause a bad influence to the potential during general discharge of an electron, the battery voltage may be lowered.

In order to remove the initial high potential, another method has been suggested where a battery is predischarged shortly after the battery has been manufactured.

In Japanese Patent Laid-Open Publication No. 53-123835, a method of manufacturing a lithium battery by means of the predischarge method is disclosed, wherein the battery includes lithium as a cathode active material, iron oxide as an anode active material, and a nonaqueous electrolyte which includes a mixed solution of propylene carbonate and tetrahydrofuran, and in which lithium peroxide is dissolved. According to the publication, before using the battery, more than 2% of the discharge capacity of the battery is predischarged so as to obtain flatness of discharge.

A battery which includes lithium as an active material and thionyl chloride($SOCl_2$) as an electrolyte solvent and as a soluble cathode, is disclosed in Japanese Patent Laid-Open Publication No. 52-32539. According to the publication, if a constant current is discharged in advance for a short time, the lowering of the battery capacity at a low operating temperature is controlled and the retardation time of a voltage at high temperature is improved.

A method of manufacturing a battery is also disclosed in Japanese Patent Publication No. 61-46948. In the publication, the battery includes a cathode using lithium metal as an active material, an anode using manganese dioxide as an active material, and an electrolyte. The electrolyte includes a mixed solution wherein a lithium perchlorate in a concentration of 1 mol/liter is dissolved in a mixed solution containing propylene carbonate and 1,2-dimethoxy ethane in a volume ratio of 2:1. After forming the battery, from 2 to 10% of the discharge capacity of the battery is discharged within 24 hours.

In the lithium battery, it is generally known that after manufacturing the battery, a gas generation reaction occurs in an organic electrolyte system at the manganese dioxide electrode of the lithium battery. Therefore, a method of predischarging a portion of the discharge capacity of a battery is widely used in order to reduce the high potential portion to the level of 3.3 V to 3.2 V, which is suitable for a general electric device, and to suppress the gas generation reaction at the manganese dioxide electrode. The predischarge is performed by means of either a constant-current or a constant-resistance method. Through the predischarge, the cathode made of lithium metal is converted into lithium ions while emitting electrons and lithium ions are dissolved in an electrolyte. In an anode, lithium ions and manganese dioxide react to form $Li_xMnO_2$, so the voltage is lowered and the side-reaction of manganese dioxide, which is an anode active material, with an electrolyte is suppressed to prevent the gas generation. At this time, the amount of discharge is from 2 to 10% of the total discharge capacity, 1300 mAh. In this predischarge, the discharge voltage is 3.6 V at the initial stage. After completing the predischarge, the discharge voltage drops to about 2.9 V to 3.0 V. After a predetermined time passes, the discharge voltage recovers to 3.2 V.

In order to lower the open circuit voltage of the lithium battery to below 3.35 V, at least 2% of the total discharge capacity of the lithium battery must be predischarged. In the case where more than 10% of the total discharge capacity of the lithium battery is discharged, the open circuit voltage is lowered to 3.2 V, but the life of the battery is excessively shortened. When the predischarge is performed in this manner, it is believed that the reaction of lithium ions with manganese dioxide rapidly occurs to form a lithiated film at an anode, thereby lowering the voltage. This reduction material which is formed at the reaction portion of manganese dioxide and lithium ions builds a local battery at the surface of the anode, thereby reducing the voltage to below 3.0 V. However, as time passes, it is believed that an active material of the local battery is consumed to make the whole anode uniform, so the voltage is recovered.

According to the above-mentioned method, it is easy to produce a lithium battery while maintaining the open circuit voltage thereof at below 3.35 V. However, since the recovery speed of a voltage is very slow, it takes a long time to send out the battery to the market after assembling, which is unpreferable. In addition, since the amount of the predischarge capacity is from 2 to 10% of the total amount of discharge capacity, so that at least more than 2% of the total amount of the discharge capacity should be predischarged in order to maintain the open circuit voltage at below 3.35 V, the life of the battery is shortened by the amount of the predischarged capacity. Therefore, it is preferable to supply a battery to a demander after predischarging the battery and promoting the recovery speed of the open circuit voltage.

The inventor has studied to solve such problems and found a novel method of predischarging a battery wherein a lithiated film is formed at an anode through a small amount of discharge capacity, thereby enabling the rapid recovery of the open circuit voltage of the battery.

SUMMARY OF THE INVENTION

Therefore, it is an object of the present invention to provide a novel method of predischarging a battery wherein a lithiated film can be formed at an anode through a small amount of discharge, thereby enabling the rapid recovery of the open circuit voltage of the battery.

According to the present invention, a method of manufacturing a battery is provided in which the battery includes a cathode using lithium metal as an active material, an anode using manganese dioxide as a main component of an active material, and an electrolyte including an inorganic electrolyte dissolved in a nonaqueous solvent containing at least propylene carbonate, and then the battery is predischarged by using a pulse current.

When the predischarge is performed according to the present invention, $Li_xMnO_2$ produced at the anode portion in which discharge is initiated, forms a local battery with non-reacting $MnO_2$ and the battery repeats charge-discharge cycles while using a small amount of the discharged capacity, thereby forming a uniform lithiated film at the surface of the anode. Therefore, with a small amount of the discharged capacity, a high potential portion can be removed and the gas generation reaction can be suppressed. In addition, the life of the battery is lengthened and the flatness of the battery's voltage is improved.

DETAILED DESCRIPTION OF THE PREFERRED EMBODIMENTS

Figure 1:
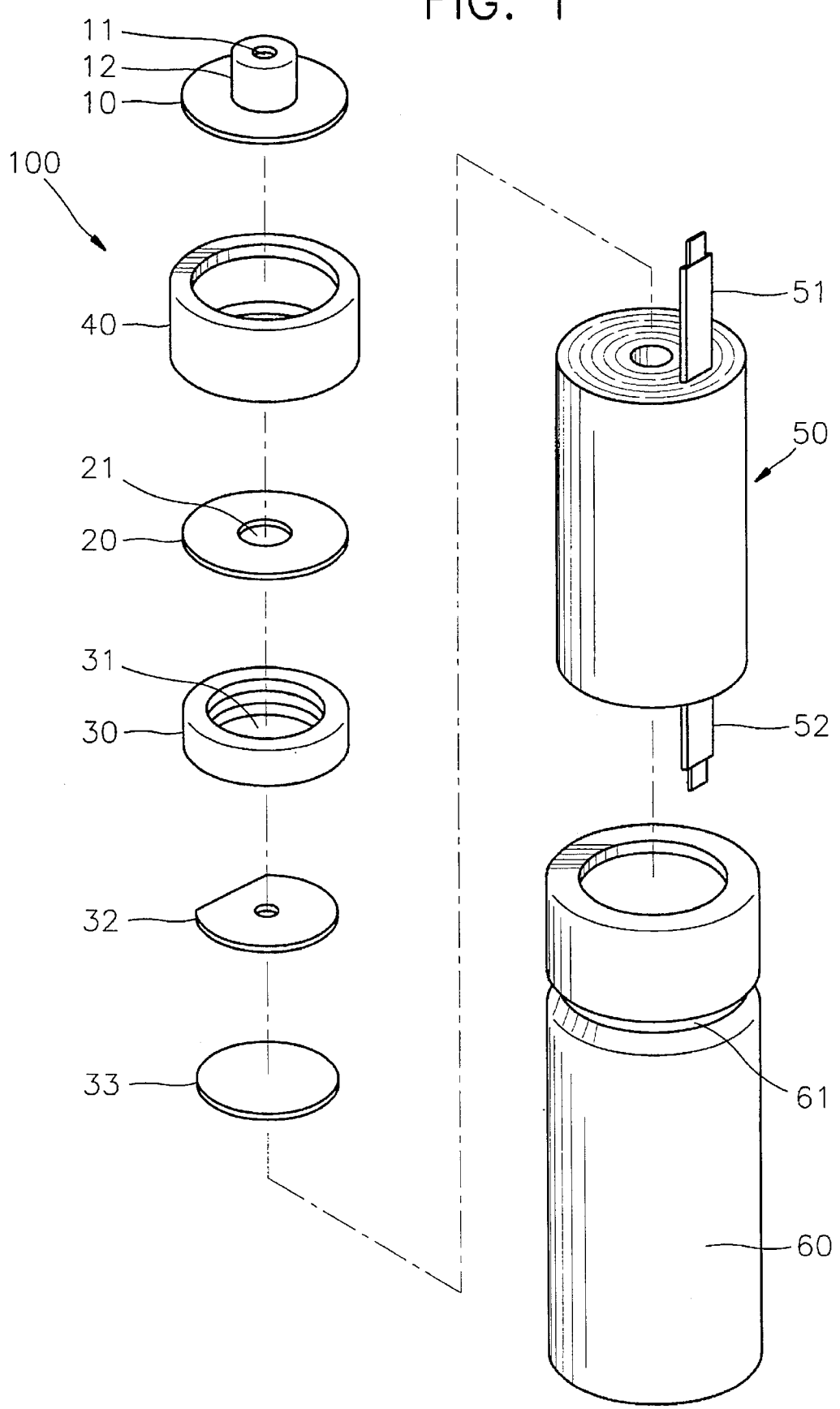
FIG. 1 is an exploded perspective view of a lithium battery according to an embodiment of the present invention.

Hereafter, the present invention will be described in detail with reference to the attached drawings.

According to the present invention, a battery is manufactured, which comprises a cathode using lithium metal as an active material, an anode using manganese dioxide as a main component of an active material, and an electrolyte. The electrolyte includes an inorganic electrolyte dissolved in a nonaqueous solvent containing at least propylene carbonate. After forming the battery, the battery is predischarged by using a pulse current. A pulse current is used to form a uniform plating film in a field of plating. It is known that even plating surfaces are formed by using the pulse current. In the present invention, shortly after assembling a battery, the battery is discharged by a small amount of discharge capacity while repeating the charging and discharging cycles, thereby forming a flat lithiated film. When predischarge is performed by means of either a conventional constant-current method or a constant-resistance method, only discharge is continuously performed for a predetermined time. Generally, since the surface of the anode of an assembled battery is uneven, a current is concentrated on a protrusion portion, so $Li_xMnO_2$ begins to form irregularly on the surfaces of the anode. Therefore, since an uneven lithiated film is formed on the surfaces of the anode, it seemed to be necessary to predischarge wholly more than about 2% of the total discharge capacity of the battery so as to obtain an open circuit voltage. However, in the present invention, a pulse current is used so that $Li_xMnO_2$ at the portion of an anode wherein discharge is initiated firstly, is partially oxidized to lithium ions during the charge cycle, thereby preventing a current from being concentrated on the anode. Thus, the surfaces of the anode can be uniformly formed. During the repeated charge-discharge cycles, a lithiated evenly formed. If a flat lithiated film is formed, a high potential portion of the battery is removed and a gas generation reaction is suppressed by a small amount of the discharged capacity.

If the amount of discharge during the predischarge is below about 0.5% of the total amount of discharge capacity of the battery, it is insufficient to remove the current at a high potential portion and to suppress a gas generation reaction. If the amount of discharge during the predischarge is more than about 2% of the total amount of discharge capacity of the battery, the recovery speed of the battery voltage after predischarge is too slow. Therefore, the predischarged amount should be from about 0.5 to about 2% of the total amount of discharge capacity of the battery, and preferably from about 1 to about 2%.

Preferably, the pulse current has a cycle of from about 0.1 to about 2 seconds. If the cycle is too long, the result may be the same as the result of a constant-current method, and if the cycle is too short, it is difficult to form a lithiated film due to a capacitance effect. Preferably, the pulse current comprises a discharge current and a charge current. In case where the pulse current comprises only a discharge current, a lithiated film may be sufficiently formed. The life of the battery may be lengthened by using a charge current, and the charge current helps in forming a stable lithiated film. Preferably, the discharge current has a current density of from about 5 to about 10 mA/cm$^2$, and the charge current has a current density below about 2 mA/cm$^2$. Preferably, the amount of the discharged capacity which is predischarged by the pulse discharge current is from about 1.0 to about 2.0% of the total discharge capacity, while the amount of the charged capacity which is charged by the pulse charge current is below about 0.5% of the total discharge capacity.

Figure 2:
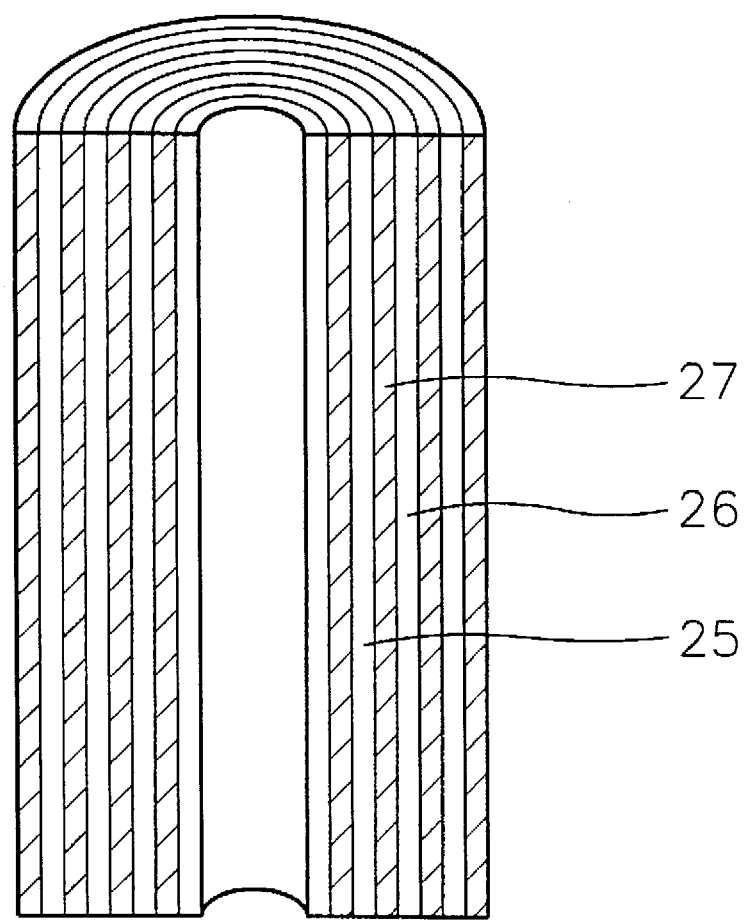
FIG. 2 is a cross sectional view showing the winding assembly shown in FIG. 1.

FIG. 1 is an exploded perspective view of a lithium battery according to an embodiment of the present invention. FIG. 2 is a cross sectional view showing the winding assembly shown in FIG. 1.

As shown in FIG. 1, a lithium battery 100 according to the present invention has a case 60. A bending portion 61 is formed at the upper portion of case 60, and an electrolyte fills the portion below bending portion 61. A winding assembly 50 is provided within case 60. Winding assembly 50 reacts with the electrolyte, thereby generating current. The generated current is applied to a load through an anode lead 51 and a cathode lead 52 of winding assembly 50. Cathode lead 52 is bent to make contact with the bottom surface of case 60. A cover 30 is positioned at the upper portion of case 60, and a through hole 31 is formed at the center of cover 30. Anode lead 51 is bent to make contact with cover 30. In cover 30, a ring plate 33, which is comprised of a plastic material and an aluminum foil 32, are provided in a stacked form. Aluminum foil 32 is easily torn to exhaust the explosive force generated by the explosion of the electrolyte in case 60.

A Positive Thermal Coefficient (PTC) thermistor 20 is positioned on cover 30. The resistance of PTC thermistor 20 approaches infinity if the temperature of PTC rises above a predetermined value, e.g., eighty degree Celsius. An opening 21 is formed at the center of PTC thermistor 20, which corresponds to through hole 31 of cover 30. If the temperature of an electrolyte rises above a predetermined value, the resistance of PTC thermistor 20 approaches infinity, so the current is cut off. A cap 10 is positioned on PTC thermistor 20, which functions as an anode terminal. At the center of cap 10, a protruding portion 12 is formed, wherein a vent hole 11 is formed at the center of protruding portion 12.

A gasket 40 for sealing the interior of case 60 is provided between the inner surface of case 60 and cap 10, PTC thermistor 20, and cover 30, and gasket 40 surrounds stacked cap 10, PTC thermistor 20, and cover 30. Case 60 is comprised of a conductive metal, and makes contact with cathode lead 52 to function as a cathode terminal. The upper end portion of case 60-is bent to fix gasket 40 at the upper position of bending portion 61.

Winding assembly 50 (spiral electrode assembly) in case 60 chemically reacts with the electrolyte filled in case 60, thereby generating current. Winding assembly 50 is wound outward, so that it has either a spiral shape or a cylindrical shape. In a lithium battery, it is necessary to make the reaction area of an electrolyte and winding assembly 50 as large as possible so as to obtain a relatively high voltage. Winding assembly 50 has an anode section 25 which is coated with an active material, a cathode section 26 which is comprised of lithium metal, and a separator 27 between anode and cathode sections 25 and 26. Winding assembly 50 has an expanded metal applied with a material which reacts with the electrolyte, and is electrically connected to anode and cathode leads 51 and 52. Winding assembly 50 is wound outward to make the reaction area with the electrolyte large.

Anode lead 51 and the expanded metal is integrally formed so as to form anode section 25, and both sides of the expanded metal is coated with the reactive material. The reactive material can be obtained by heat-treating manganese dioxide, which is available in the market, to within the temperature range of 250 to 450 degree C. The reactive material is, for example, a mixture of manganese dioxide, a conductive agent, and a binder at a ratio of 85:10:5. Carbon powder can be used as the conductive agent. Fluorine resin (such as 4-fluoridized ethylene resin) powder may be used as a binder. The expanded metal is either a net shaped or a slitted aluminum sheet. After coating the reactive material to the expanded metal by the pressure of a roll press, the coated expanded metal is heat-treated within the temperature range of 250 to 350 degree C., thereby completing anode section 25.

Thereafter, cathode section 26 is formed by cutting a lithium sheet in such a manner that cathode section 26 has a size corresponding to the size of anode section 25. A separator 27, comprised of an unwoven fabric of an olefin polymer such as polypropylene, is placed between cathode section 26 and anode section 25. Separator 27 is manufactured by being immersed in an electrolyte comprising a solvent such as a mixture of propylene carbonate and 1,2-dimethoxy ethane with an electrolyte such as LiBF$_4$ dissolved therein. Then, the stacked structure of anode section 25, separator 27, and cathode section 26 is wound in a spiral shape, thereby completing winding assembly 50.

Thereafter, winding assembly 50 obtained in this manner is placed in case 60, and other members of the battery are assembled according to a conventional battery assembling process so as to complete a lithium battery.

Figure 3A:
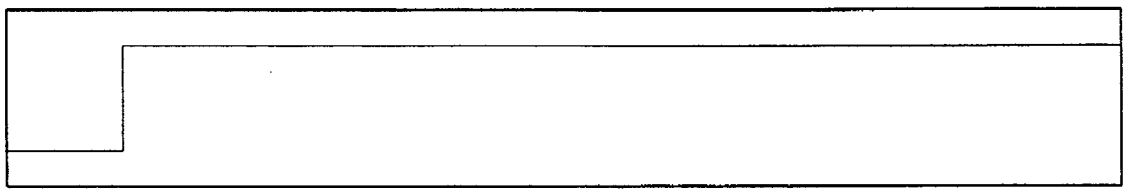
FIG. 3A is a graph of a current which is used during predischarge according to a constant-current method.
Figure 3B:
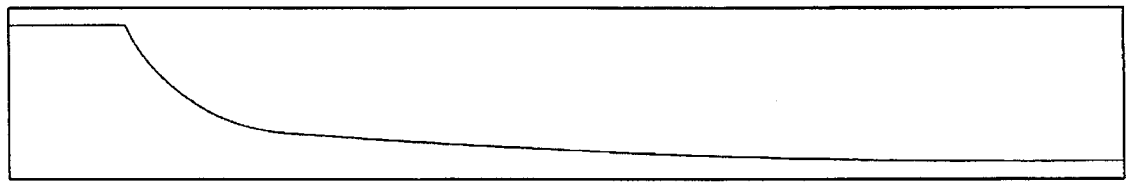
FIG. 3B is a graph showing the change in the battery voltage during predischarge according to the current shown in FIG. 3A.
Figure 3C:
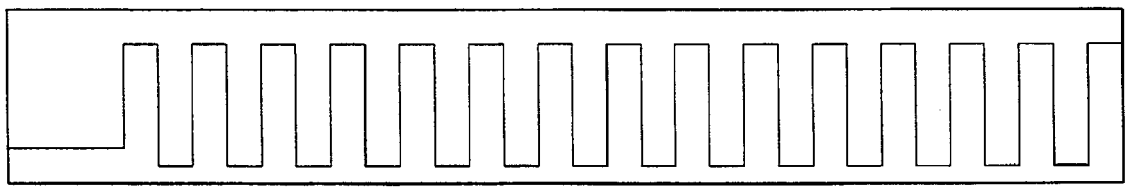
FIG. 3C is a waveform view showing a pulse current which is used during the predischarge method of the present invention.
Figure 3D:
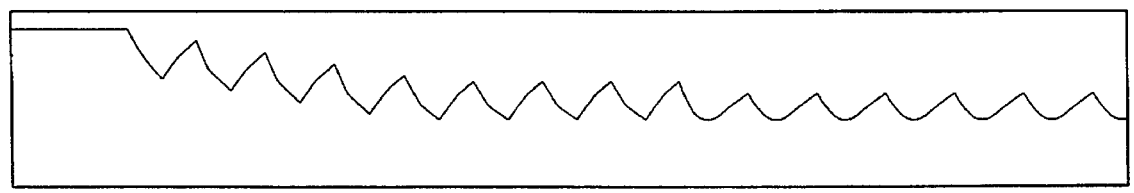
FIG. 3D is a graph showing the change in the battery voltage during the predischarge process according to the current shown in FIG. 3C.

The following is a description of the manufactured lithium battery described above as it is predischarged according to the predischarge method of the present invention, and according to a conventional constant-current method. FIG. 3C is a waveform view showing a pulse current which is used during the predischarge method of the present invention, and FIG. 3D is a graph showing the change in the battery voltage during the predischarge process according to the current shown in FIG. 3C. As a pulse current, a current of 400 mA was used during discharge and a current of 80 mA was used during charge. Charge-discharge cycles were repeated every 0.6 seconds. The amount of the predischarged capacity by means of the pulse discharge was 2% of the total discharge capacity. The amount of the charged capacity by means of the charge current was 0.4% of the total discharge capacity. Therefore, the net predischarged capacity was 1.6% of the total discharge capacity. During the discharge process according to a constant-current method, the amount of the predischarged capacity was 5% and 10% of the total discharge capacity at a current of 1.3 A. FIG. 3A is a graph of the current which is used during predischarge, and FIG. 3B is a graph showing the change in the battery voltage during predischarge according to the current shown in FIG. 3A. A discharge test of the batteries obtained respectively according to the present invention and to the constant-current method was performed at the temperature of 20° C.

The following is a description of a battery performance test, wherein the batteries were obtained respectively according to a pulse-discharge method of the present invention, and according to a conventional constant-current method. Firstly, after fixing a discharge current to 1.15 A, a battery capacity was measured until a voltage fell below 1.7 V. Secondly, a battery capacity was measured by means of a pulse current until a voltage fell below 1.3 V. The result is shown in the following table 1.

TABLE 1

Total Amount of Discharge Capacity in a Battery Capacity Test

| test method | a battery in 10% predischarge | a battery in 5% predischarge | a battery according to the predischarge method of the present invention |
| --- | --- | --- | --- |
| 1.15A discharge (mAh) | 884 | 958.3 | 1000.3 |
| pulse discharge (cycles) | 1017 | 1021 | 1058 |

As shown in the Table 1, the battery which was predischarged according to the predischarge method of the present invention has a superior battery capacity to the battery which was predischarged according to the conventional constant-current method. As seen from the above results, the battery obtained according to the predischarge method of the present invention has a longer life than the battery obtained according to the conventional constant-current method.

Figure 4:
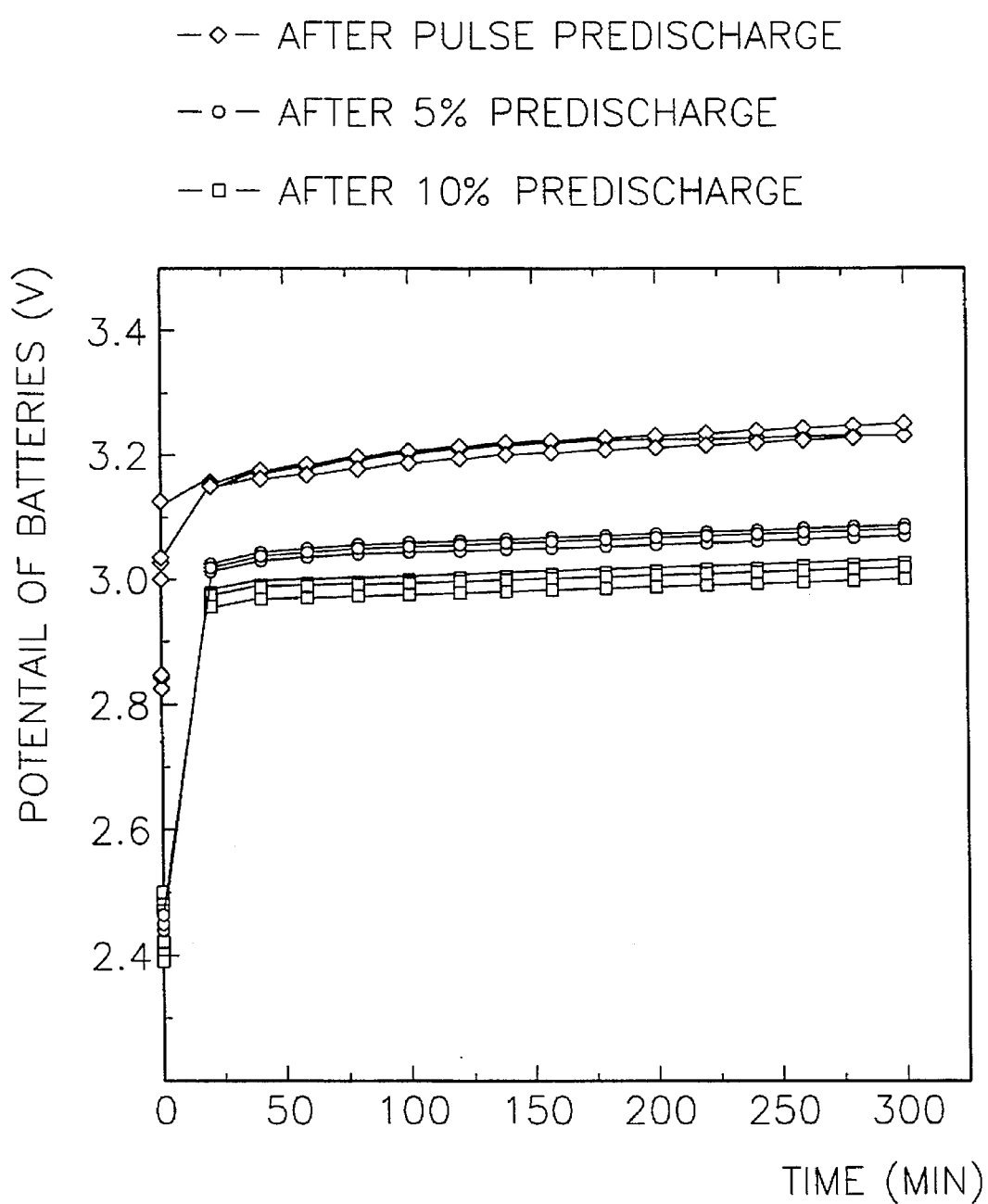
FIG. 4 is a graph obtained by measuring the change in the open circuit voltages of batteries obtained according to a pulse-discharge method of the present invention, and according to a conventional constant-current method.

The following is a description of the change in an open circuit voltage of batteries obtained respectively according to a pulse-discharge method of the present invention, and according to a conventional constant-current method. FIG. 4 is a graph showing the change in the measured open circuit voltage. In FIG. 4, a line -◇- is a graph showing the open circuit voltage of the battery which was obtained according to the pulse-discharge method of the present invention. A line -○- is a graph showing the open circuit voltage of the battery which was obtained by a 5% predischarge. A line -□- is a graph showing the open circuit voltage of the battery which was obtained by a 10% predischarge.

As shown in FIG. 4, the voltage of the battery which had been predischarged according to the method of the present invention approached 3.2 V within 1 to 2 hours. However, the voltage of the battery which had been predischarged according to the conventional constant-voltage method did not approach 3.2 V even after more than 5 hours elapse. As seen from the above results, the voltage recovery speed of the battery which has been obtained according to the predischarge method of the present invention is faster than that of the battery which has been obtained according to the conventional constant-voltage method. Therefore, after the battery is assembled, the battery according to the present invention may be quickly sent out to the market.

Figure 5:
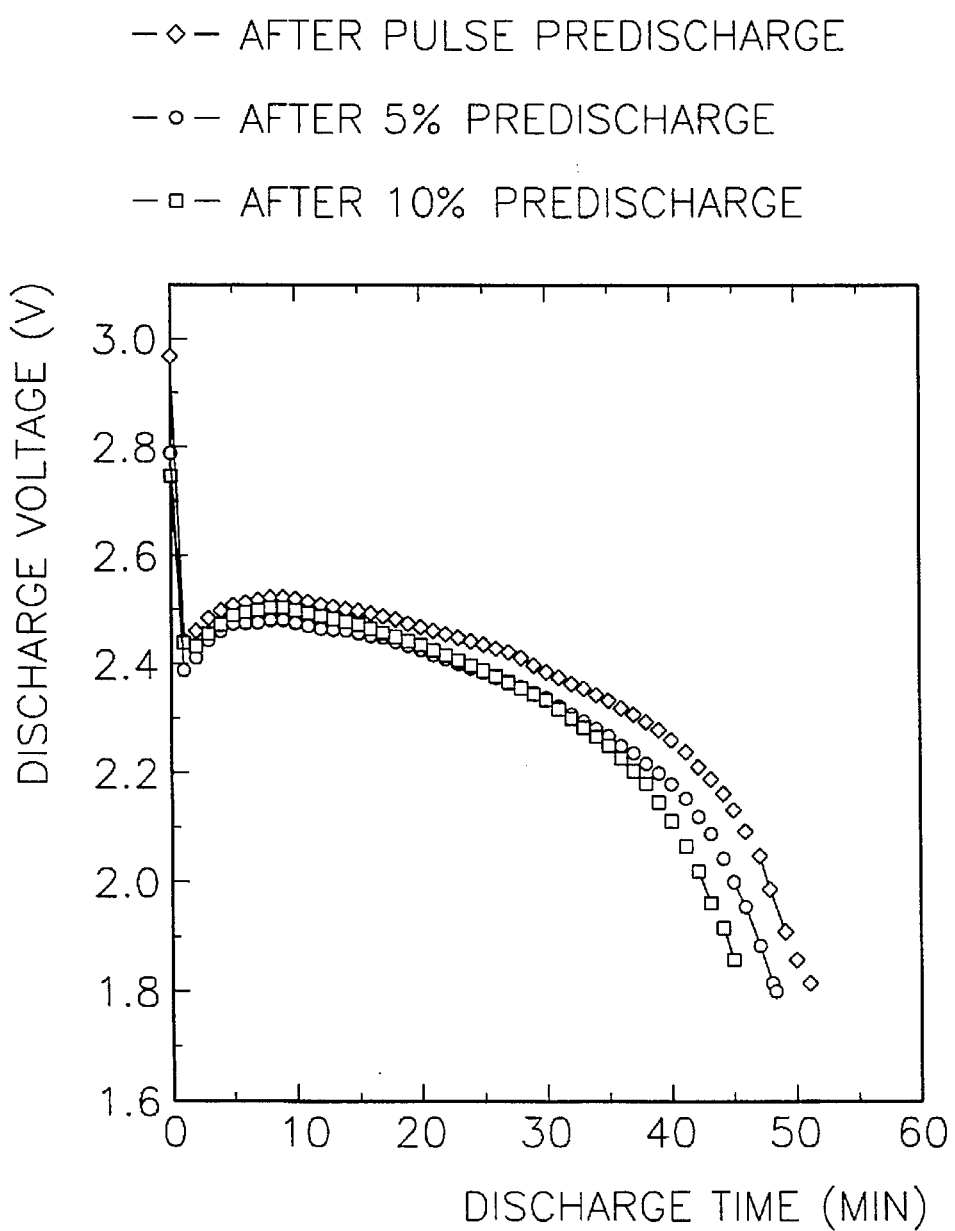
FIG. 5 is a graph showing the change in the battery voltages that results from a constant-current discharge method, wherein the batteries are obtained according to a pulse-discharge method of the present invention, and according to a conventional constant-current method.
Figure 6:
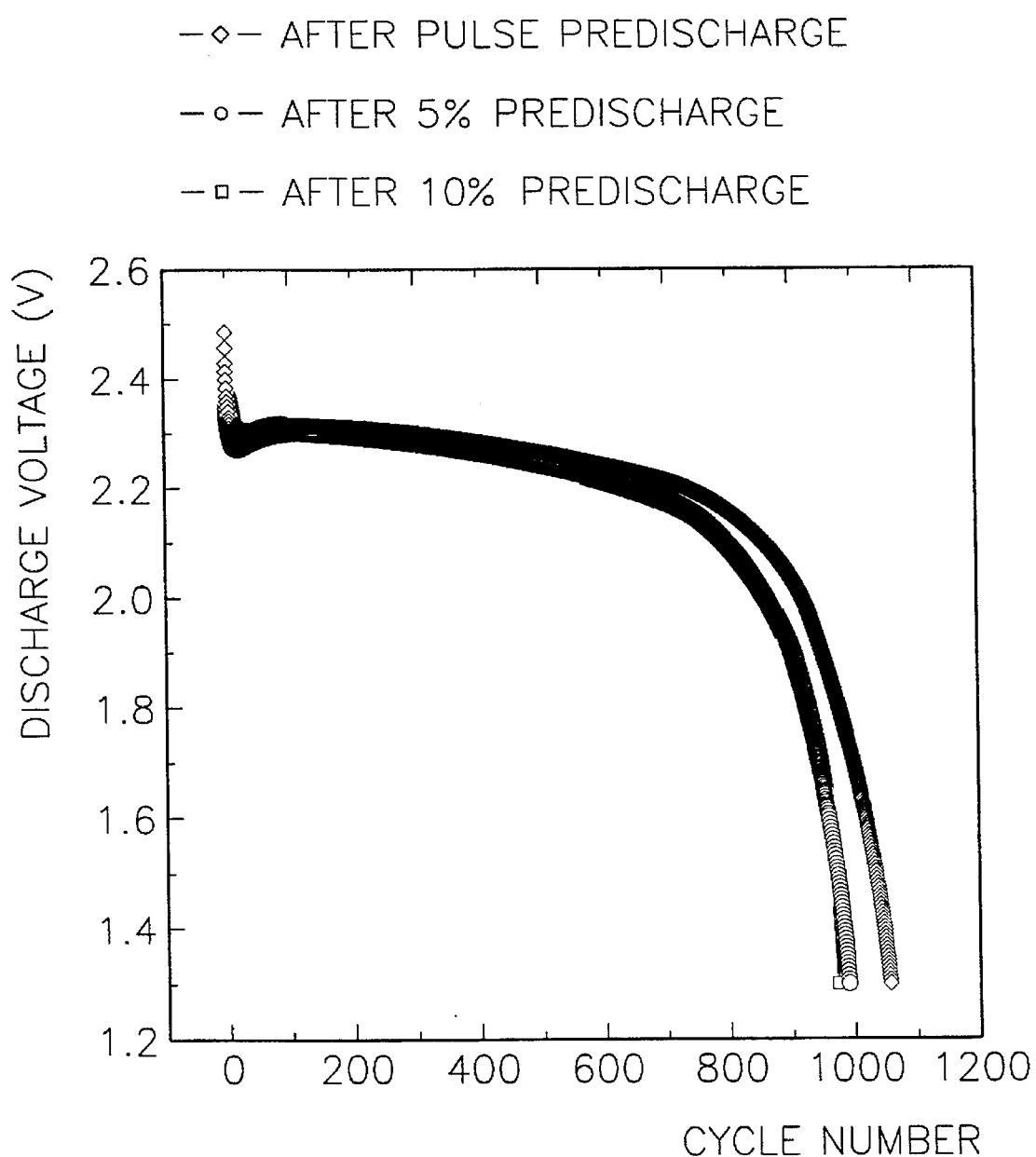
FIG. 6 is a graph showing the change in the battery voltages that results from a pulse-current discharge method, wherein the batteries are obtained according to a pulse-discharge method of the present invention, and according to a conventional constant-current method.

The following describes a change in the battery voltage according to a pulse discharge method of the present invention, and according to a conventional constant-current method at a discharge current of 1.2 A, wherein the batteries were obtained according to a pulse-discharge method of the present invention, and according to a conventional constant-current method. FIG. 5 is a graph showing the change in the battery voltage which is measured during a constant-current discharge. FIG. 6 is a graph showing the change in the battery voltage which is measured during a pulse-current discharge. In FIGS. 5 and 6, a line -◇- is a graph showing the battery voltage which is obtained according to the method of the present invention, a line -○- is a graph showing the battery voltage which is obtained by a 5% predischarge, and a line -□- is a graph showing the battery voltage which is obtained by a 10% predischarge. As seen from the above FIGS. 5 and 6, the flatness of the battery voltage which has been predischarged according to the method of the present invention is superior to the battery which is predischarged according to the conventional constant-voltage method. In addition, the battery which was predischarged according to the method of the present invention also has a longer life than the battery which was predischarged according to the conventional constant-voltage method.

Also, when the gas generation due to a side-reaction has been observed, the change in an open circuit voltage of the battery has not been observed in the batteries of both the battery which has been obtained according to the method of the present invention, and the battery which has been obtained according to the conventional constant-current method. In addition, an explosion or an expansion of a bend film has not been observed in either battery, even though several days have elapsed. As seen from the above results, it can be noted that the gas generation reaction is suppressed.

As described above, the battery which is obtained according to the predischarge method of the present invention is superior to the battery which is manufactured according to the conventional constant-current method, in terms of the length of battery life and the flatness of battery voltage.

While a preferred embodiment of the present invention has been particularly shown and described with reference to the attached drawings, it will be understood by those skilled in the art that various changes in form and detail may be effected therein without departing from the spirit and scope of the invention as defined by the appended claims.

What is claimed is:

1. A method of manufacturing a battery comprising the steps of:

assembling a battery which includes a cathode using lithium metal as an active material, an anode using manganese dioxide as a main component of an active material, and an electrolyte including an inorganic electrolyte dissolved in a nonaqueous solvent containing at least propylene carbonate; and predischarging said battery by using a pulse current.

2. A method of manufacturing a battery according to claim 1, wherein the amount of the discharged capacity during said predischarge is not more than about 2% of the total amount of discharge capacity of the battery.

3. A method of manufacturing a battery according to claim 2, wherein the amount of the discharged capacity during said predischarge is from about 1 to about 2% of the total amount of discharge capacity of the battery.

4. A method of manufacturing a battery according to claim 1, wherein said pulse current has a cycle of about 0.1 to about 2 seconds.

5. A method of manufacturing a battery according to claim 1, wherein said pulse current includes a discharge current and a charge current.

6. A method of manufacturing a battery according to claim 5, wherein the discharge current has a current density of about 5 to about 10 mA/cm$^2$, and the charge current has a current density of about 2 mA/cm$^2$ or less.

7. A method of manufacturing a battery according to claim 5, wherein an amount of the discharged capacity which is predischarged by means of the discharge current is from about 1.0 to about 2.0% of a total discharge capacity, and an amount of the charged capacity which is charged by means of the charge current is not more than about 0.5% of the total discharge capacity.

8. A method of manufacturing a battery comprising the steps of:

assembling a battery which includes a cathode using a lithium metal as an active material, an anode using manganese dioxide as a main component of an active material, and an electrolyte including an inorganic electrolyte dissolved in a nonaqueous solvent containing at least propylene carbonate; and predischarging said battery by using a pulse current which has a cycle of about 0.1 to about 2 seconds and which includes a discharge current and a charge current, wherein the amount of the discharged capacity during said predischarging step is from about 1.0 to about 2.0% of a total discharge capacity of the battery.

9. A method of manufacturing a battery according to claim 8, wherein the discharge current has a current density of about 5 to about 10 mA/cm$^2$, and the charge current has a current density of about 2 mA/cm$^2$ or less.

10. A method of manufacturing a battery according to claim 8, wherein an amount of a discharged capacity which is predischarged by means of the discharge current is from about 1.0 to about 2.0% of a total discharge capacity, and an amount of the charged capacity which is charged by means of the charge current is not more than about 0.5% of the total discharge capacity.

11. A method of manufacturing a battery comprising the steps of:

assembling a battery which includes a cathode using a lithium metal as an active material, an anode using manganese dioxide as a main component of an active material, and an electrolyte including an inorganic electrolyte dissolved in a nonaqueous solvent containing at least propylene carbonate; and predischarging the battery by using a pulse current having a cycle of about 0.1 to about 2 seconds, which includes a discharge charge current having a current density of about 5 to 10 mA/cm$^2$, and a charge current having a current density of about 2 mA/cm$^2$ or less, wherein an amount of a discharged capacity which is predischarged by means of the discharge current is from about 1.0 to about 2.0% of a total discharge capacity, and an amount of a charged capacity which is charged by means of the charge current is not more than about 0.5% of the total discharge capacity, so that a net amount of the discharged capacity during said predischarging step is from about 0.5% to about 2.0% of the total discharge capacity of the battery.

* * * * *